(12) United States Patent
Haine et al.

(10) Patent No.: US 10,425,120 B2
(45) Date of Patent: Sep. 24, 2019

(54) SIGNAL ISOLATION CONTROL APPARATUS AND METHOD OF CONTROLLING A HYBRID JUNCTION

(71) Applicant: u-blox AG, Thalwil (CH)

(72) Inventors: John Leslie Haine, Cambridge (GB); Leo Peter Laughlin, Bristol (GB)

(73) Assignee: u-blox AG, Thalwil (CH)

( * ) Notice: Subject to any disclaimer, the term of this patent is extended or adjusted under 35 U.S.C. 154(b) by 5 days.

(21) Appl. No.: 15/549,856

(22) PCT Filed: Feb. 10, 2015

(86) PCT No.: PCT/EP2015/052800
§ 371 (c)(1),
(2) Date: Aug. 9, 2017

(87) PCT Pub. No.: WO2016/128032
PCT Pub. Date: Aug. 18, 2016

(65) Prior Publication Data
US 2018/0026672 A1    Jan. 25, 2018

(51) Int. Cl.
*H04B 1/00* (2006.01)
*H04B 1/58* (2006.01)
*H04B 1/525* (2015.01)

(52) U.S. Cl.
CPC .......... *H04B 1/525* (2013.01); *H04B 1/582* (2013.01); *H04B 1/005* (2013.01); *H04B 1/581* (2013.01)

(58) Field of Classification Search
CPC ........ H04B 1/525; H04B 1/582; H04B 1/005; H04B 1/581

USPC ......................................................... 333/126
See application file for complete search history.

(56) References Cited

U.S. PATENT DOCUMENTS

| | | | |
|---|---|---|---|
| 6,311,045 B1 | 10/2001 | Domokos | |
| 8,780,963 B1 | 7/2014 | Haddadin et al. | |
| 9,344,122 B1 * | 5/2016 | Haddadin | H04B 1/0475 |
| 2013/0241669 A1 | 9/2013 | Mikhemar et al. | |

OTHER PUBLICATIONS

International Search Report PCT/ISA/210 for International Application No. PCT/EP2015/052800 dated Oct. 15, 2015.
(Continued)

*Primary Examiner* — Robert J Pascal
*Assistant Examiner* — Kimberly E Glenn
(74) *Attorney, Agent, or Firm* — Finnegan, Henderson, Farabow, Garrett & Dunner LLP

(57) ABSTRACT

A signal isolation control apparatus for controlling duplexing of signals to be transmitted through and received from an antenna. The apparatus includes a transmitter chain tap input for coupling to a transmitter chain. An auxiliary transmitter chain is operably coupled to the transmitter chain tap input for processing a transitory signal tapped from the transmitter chain, the auxiliary transmitter chain including an adaptive filter unit and a balance node output for operably coupling to a balance node of a hybrid junction. The adaptive filter unit has a signal leakage monitoring input for operably coupling to an output node of the hybrid junction. The auxiliary transmitter chain is arranged to process the tapped transitory signal in order to generate and apply an isolation signal at the balance node output for maximizing isolation of an output node of the hybrid junction from an input node of the hybrid junction.

24 Claims, 10 Drawing Sheets

(56) References Cited

OTHER PUBLICATIONS

Written Opinion of the International Searching Authority PCT/ISA/2237 for International Application No. PCT/EP2015/052800 dated Oct. 15, 2015.

Mikhemar, M. et al., "A Multiband RF Antenna Duplexer on CMOS: Design and Performance," IEEE Journal of Solid-State Circuits, vol. 48, No. 9, pp. 2067-2077, Sep. 2013.

Laughlin, L. et al., "Optimum Single Antenna Full Duplex Using Hybrid Junctions," IEEE Journal on Selected Areas in Communications, vol. 32, No. 9, pp. 1653-1661, Sep. 2014.

* cited by examiner

SIGNAL ISOLATION CONTROL APPARATUS AND METHOD OF CONTROLLING A HYBRID JUNCTION

FIELD OF THE INVENTION

The present invention relates to a signal isolation control apparatus of the type that, for example, can be used to control a hybrid junction to provide duplexing functionality. The present invention also relates to a method of controlling a hybrid junction, the method being of the type that, for example, controls the hybrid junction so as to provide duplexing functionality.

BACKGROUND OF THE INVENTION

In a wireless communications system, such systems comprise a network infrastructure and user equipment, which can for example be portable communications devices. Such communications devices typically receive and transmit signals through the same antenna or set of antennas. This means that some form of duplexing scheme is required in order to allow the device to separate the incoming and outgoing signals such that the former is not swamped by the latter. In this respect, Time-Division Duplexing (TDD) and Frequency-Division Duplexing (FDD) are both well-known duplexing schemes.

Availability of radio spectrum in which to operate the communications system is known to be a limiting factor. So-called 4G, or Long Term Evolution (LTE), is the successor to existing 2G and 3G communications systems. Indeed, LTE-compliant networks are already in operation in many countries. For historical reasons, there are 38 LTE operating frequency bands for the LTE standard as defined in the 3G Partnership Project (3GPP) Rel 11 of the LTE standard, of which 26 require FDD operation. More bands are likely to be defined in later releases of the LTE standard as further mobile broadband spectrum is made available by governments in various territories.

In FDD radio operation, there are two separate carriers at different frequencies, one for the uplink transmission and one for the downlink transmission. Isolation between the downlink and the uplink transmissions is usually achieved by transmission/reception filters called diplexing filters (duplexers or diplexers). These filters are typically implemented as two highly selective filters, one centred on a receive frequency band, the other centred on the transmit frequency band to separate the transmit and receive signals, thereby preventing the transmit signal from interfering with the receive signal. Acoustic resonator filters, such as Surface Acoustic Wave (SAW) filters, are typically used to provide the low insertion loss and sharp roll-off required of duplexing filters. Although these are individually small and cheap, a communications device that is to support multiple frequency bands requires one diplexing filter per frequency band to be supported and further Radio Frequency (RF) switching for selection between the frequency bands so that the duplexing filters can share the antenna.

Furthermore, these filters cannot be integrated with a CMOS circuit owing to the high-Q resonators used to build SAW filters and so they must be implemented off-chip. This is not usually problematic for a simple radio transceiver operating on a single frequency band. However, modern radio transceivers are usually multi-band. As mentioned above, the LTE standard currently specifies 26 FDD frequency bands. To support all of the specified frequency bands would require a manufacturer of user equipment to use multiple filters due to the need for one diplex filter per frequency band supported. A bank of discrete duplexers is one known approach, the bank being connected to an antenna, transmitter and receiver via a multi-way RF switch, which selects the appropriate duplexer based upon a required frequency band of operation. Such an approach increases the complexity of the user equipment, as well as increasing the overall size and cost of the multi-band transceiver. This approach can also lead to performance penalties; for example the introduction of the RF switch can result in power losses as multiple frequency bands are supported.

Many device manufacturers simply circumvent this problem by designing and manufacturing differently configured devices supporting different sets of frequency bands of operation. Manufacturers thus provide a range of devices each of which is operable in different groups of territories with different frequency band combinations. It can therefore be appreciated that obviating the need for the above-described filters would remove a barrier to the manufacture of a "world phone", the benefits of which would provide economies of scale to the mobile telephony industry, and mitigate an inconvenience for the international traveler.

Therefore, there is a significant market demand for a solution that is able to replace the fixed tuned diplexer with a flexible device that can support multiple, preferably all, frequency bands.

Although it is possible to tune diplexing filters making up a diplexer, such an approach is currently technically impractical because very high Q-factor resonators are required to achieve the desired selectivity and low power loss. Currently, in order to achieve the small filter size required, such resonators are only realisable as acoustic resonators, which have a well-known bi-resonant characteristic that limits their electrical tuning to only a small frequency range.

An alternative duplexing solution is the use of so-called hybrid junction or hybrid circuit. This is a 4-port network that can separate the forward and reverse wave directions in a transmission line. Hybrid junctions can be made in a number of ways, including using transformers, waveguides ("magic tees"), or microstrip ("directional couplers"). Hybrid junctions can also be made using active circuits, as is the case for modern electronic analogue wireline phones.

The hybrid junction typically comprises a first (transmit) port, a second (antenna) port, a third (receive) port and a fourth (balance) port. In operation of an ideal hybrid junction, all power incident at the transmit port is divided between the antenna port and the balance port. Likewise, all power incident upon the receive port is divided between the antenna port and the balance port. The device is therefore lossless and reciprocal, and has two symmetry planes with similar properties around each.

Broadband hybrids can be made using transformers, and single-transformer circuits, for example as described in "A Multiband RF Antenna Duplexer on CMOS: Design and Performance" (M. Mikhemar, H. Darabi, and A. A. Abidi, IEEE Journal of Solid-State Circuits, vol. 48, pp. 2067-2077, 2013).

A theoretical hybrid junction, when used as a duplexer, has a power amplifier of a transmitter chain coupled to the transmit port thereof and a low-noise amplifier coupled to the receive port. Transmit power applied at the transmit port by the power amplifier is, as described above, divided between the antenna port and the balance port and the low-noise amplifier is isolated, i.e. there is no leakage of a transmit signal into the receiver as long as the reflection coefficients at the antenna port and the balance port are in balance.

In practice, however, use of the hybrid junction as a duplexer suffers from a number of drawbacks. Firstly, the impedance of the antenna, and so by extension the impedance at the antenna port, typically exhibits variation in both the time domain and frequency domain. The impedance of the antenna can vary with time, for example owing to objects moving in the proximity of the antenna, and consequently, it is necessary to adapt dynamically the impedance at the balance port to the impedance at the antenna port to account for these changes. The antenna impedance also typically varies with frequency and so, to obtain balance at the particular frequency of interest, the impedance at the balance port must be adapted accordingly, and a good balance may not be achievable over a sufficiently wide system bandwidth, for example the 20 MHz needed for an LTE channel.

Secondly, other coupling mechanisms cause leakage of some of the transmit signal from the transmit port to the receive port of the hybrid junction. As such, isolation of the receive port from the transmit port is limited.

A further technical disincentive to use of the hybrid junction as a duplexer is the absorption of power required to achieve the impedance balance. In this respect, hybrid junctions are typically symmetrical, as mentioned above, with an equal 3 dB loss in each branch of the hybrid junction. Thus, in the context of duplexing, half the transmit power is "wasted" and 3 dB is effectively added to the noise figure by virtue of the waste of received power impacting the signal-to-noise ratio (SNR) of the received signal.

Despite the above-mentioned drawbacks associated with use of the hybrid junction as a duplexer, attempts have been made to obviate or at least mitigate the disadvantages. For example, "Optimum Single Antenna Full Duplex Using Hybrid Junctions" (Laughlin, Beach, Morris and Haine, IEEE Journal of Selected Areas In Communications, Vol. 32, No. 9, September 2014, pages 1653 to 1661), considers an arbitrary antenna with an impedance that can vary widely with frequency and with a return loss that is likely to be of the order of 10 dB minimum (as long as there are no de-tuning proximity effects). This is a practical reality for a transceiver circuit that can be built into a wide range of end products and could possibly be connected through an unknown length of transmission line. So-called Electrical Balance (EB) of the hybrid junction is proposed in the above-referenced document.

However, the LTE (and other) communications standards are written with a conventional duplexing filter in mind, which supports a duplexing gap between the transmit and receive frequency bands. Unfortunately, a balanced impedance of an EB hybrid junction duplexer only provides good isolation over a limited bandwidth, and ideally this would attenuate both interferences to the receiver from in-band signals and out-of-band signals from the transmitter, and therefore needs to cover both transmit and receive frequency bands. As such, the duplexing gap of the relevant standards is not supported by the EB hybrid junction duplexer. Also, attempting to balance a real (imperfect) EB hybrid junction duplexer over a sufficiently wide bandwidth using a real variable physical impedance is very difficult.

Consequently, use of an EB hybrid junction duplexer is currently impractical as compared with existing duplexing filters.

BRIEF SUMMARY OF THE INVENTION

According to a first aspect of the present invention, there is provided a signal isolation control apparatus for controlling duplexing of signals to be transmitted through and received from an antenna, the apparatus comprising: a transmitter chain tap input for coupling to a transmitter chain; and an auxiliary transmitter chain operably coupled to the transmitter chain tap input for processing a transitory signal tapped from the transmitter chain, the auxiliary transmitter chain comprising an adaptive filter unit and a balance node output for operably coupling to a balance node of a hybrid junction; wherein the adaptive filter unit has a signal leakage monitoring input for operably coupling to an output node of the hybrid junction; and the auxiliary transmitter chain is arranged to process the tapped transitory signal in order to generate and apply an isolation signal at the balance node output for maximising isolation of an output node of the hybrid junction from an input node of the hybrid junction.

The isolation signal may be a feedforward signal.

The isolation signal may be equal to or be a multiple or proportion of a transmission signal reflected from the antenna. The effective reflection coefficient seen at the balance node and the antenna node may therefore be substantially the same.

The apparatus may further comprise: a signal leakage monitoring tap operably coupled to the signal leakage monitoring input; wherein the auxiliary transmitter chain may be arranged to receive, when in use, a receiver-processed leaked signal via the signal leakage monitoring input.

The apparatus may further comprise: a receiver operably coupled to the signal leakage monitoring input for receiver-processing a leaked signal at the output node of the hybrid junction.

The receiver may comprise a down-converter. The receiver may be arranged to operate in respect of a bandwidth corresponding to a transmission band and a reception band.

The auxiliary transmitter chain may comprise transmitter chain processing stage units having an input operably coupled to an output of the adaptive filter unit and an output operably coupled to the balance node output; the transmitter chain processing stage units may be arranged to complete processing of the tapped transitory signal in accordance with a desired modulation scheme for the transmitter chain.

The isolation signal may be a substantially antiphase signal for cancelling a transmission signal generated by the transmitter chain.

The transmitter chain processing stage units may comprise a non-linearity generator unit arranged to modify the transitory signal being processed by the auxiliary transmitter chain so that the isolation signal generated by the auxiliary transmitter chain may comprise intentional non-linear signal components.

The transmitter chain processing stage units may comprise an amplifier succeeding the non-linearity generator unit, and processing by the amplifier of a pre-amplification isolation signal generated in the auxiliary transmitter chain and as modified by the non-linearity generator unit may result in the isolation signal comprising the non-linear signal components.

The leaked signal at the output node may comprise a spectral component outside of a transmit frequency band; the non-linear signal components of the isolation signal may comprise spectral components that are in antiphase with and spectrally coincident with the spectral components of the leaked signal are outside of the transmit frequency band.

The isolation signal may therefore be used to input signal components into the hybrid junction that cancel or substantially attenuate out of band signal components of the transmission signal.

The apparatus may further comprise: an impedance operably coupled to the balance node output and constituting a sink for power output at the balance node output. The impedance may be controllable.

The impedance may be controllable by providing a number of alternative resistances that can be switchably selected. A number of fixed capacitances and inductances may also be provided that may be switchably selected.

According to a second aspect of the present invention, there is provided a duplexer apparatus comprising: the signal isolation control apparatus as set forth above in relation to the first aspect of the invention; and a hybrid junction having the input node for receiving a transmission signal, the antenna node for coupling to the antenna, the output node for outputting a received signal from the antenna, and the balance node; wherein the balance node output of the auxiliary transmitter chain is operably coupled to the balance node of the hybrid junction; and the signal leakage monitoring input is operably coupled to the output node of the hybrid junction.

The adaptive filter unit may comprise an adaptive filter having a transfer function arranged to approximate an estimate of the amplitude and phase of signal leakage between the input node and the output node of the hybrid junction; the approximation generated may be in antiphase to the signal leakage.

The transfer function may be arranged to model leakage characteristics of the hybrid junction attributable only to signals reflected in the hybrid junction as a result of an impedance mismatch between the antenna node and the balance node.

The adaptive filter unit may adapt filter coefficients throughout a period of detection of the presence of the tapped transmit chain signal.

The adaptive filter unit may comprise a frequency domain equalizer arranged to process subcarriers from the tapped transmit chain signal by multiplying components of the Fourier transform of the transitory signal by a complex coefficient vector corresponding to the transfer function.

The adaptive filter unit may be arranged to modify, when in use, the coefficients of the adaptive filter in response to a receive feedback signal.

The transmission signal, when applied to the input node of the hybrid junction, may be leaked to the output node of the hybrid junction via a notional self-interference channel and the isolation signal, when applied to the input node of the hybrid junction, may be leaked to the output node of the hybrid junction via a notional cancellation channel.

The adaptive filter unit may be arranged to modify the tapped transitory signal so that the modified transitory signal when completely processed by the auxiliary transmitter chain may result in the isolation signal received at the output node via the cancellation channel cancelling the leaked transmission signal received at the output node via the self-interference channel.

The adaptive filter unit may comprise a coefficient processor operably coupled to the signal leakage monitoring input and the adaptive filter; the coefficient processor may be arranged to modify, when in use, the coefficients of the adaptive filter in response to the receive feedback signal.

According to a third aspect of the present invention, there is provided a wireless transceiver apparatus comprising: a duplexer apparatus as set forth above in relation to the second aspect of the invention; and a transmitter chain operably coupled to the input node of the hybrid junction and arranged to generate and apply the transmission signal at the input node of the hybrid junction.

The tapped transitory signal may be a signal tapped out of the transmitter chain prior to subcarrier mapping. Alternatively, the tapped transitory signal may be a signal tapped out of the transmitter chain following subcarrier mapping.

The transmitter chain may be arranged to generate and apply a test signal to the input node of the hybrid junction during which time the auxiliary transmitter chain is arranged to apply the isolation signal at the balance node; the receiver may be arranged to receive a first leaked signal, $S_{RX1}(\omega)$; the transmitter chain may be arranged not to apply the test signal at the input node of the hybrid junction after measurement of the first leaked signal, $S_{RX1}(\omega)$, during which time the auxiliary transmitter chain may be arranged to process the transitory signal corresponding to the test signal and apply the isolation signal generated from the test signal at the balance node of the hybrid junction; the receiver may be arranged to receive a second leaked signal, $S_{RX2}(\omega)$; and the adaptive filter unit may be arranged to calculate the coefficients of the adaptive filter using the first and second leaked signals, $S_{RX1}(\omega)$, $S_{RX2}(\omega)$.

The test signal may be used to generate a start-up isolation signal that may be subsequently adjusted as non-test transmission signals are transmitted through the hybrid junction.

The test signal may be a sounding signal with a suitable spectrum to probe the response of signal leakage through the hybrid junction from the input node to the output node thereof. Whilst the test signal may be applied to the antenna, the isolation signal may be set to zero; the balance node of the hybrid junction may be terminated by a fixed normalising impedance. The signal at the output node of the hybrid junction may constitute the transmission signal filtered in accordance with leakage characteristics of the hybrid junction.

During subsequent sounding signals, and/or real data symbols, the signal at the output node may be correlated with the tapped transmit chain signal to derive corrected filter coefficients, for example using a standard least mean squares type algorithm on a per subcarrier basis.

The auxiliary transmitter chain may further comprise an up-sampler arranged to increase a sampling rate of the tapped transmit chain signal.

The isolation signal may be arranged so as to interfere destructively with the transmission signal leaked to the output node of the hybrid junction over a frequency range of interest.

The transmission signal may comprise unwanted non-linear signal components; the intentional non-linear signal components may be in antiphase with the unwanted non-linear signal components.

The transmitter chain may comprise an up-converter and the auxiliary transmitter chain may comprise another up-converter; and the up-converter and the another up-converter may be arranged to ensure phase coherence such that local oscillator noise components cancel out.

According to a fourth aspect of the present invention, there is provided a communications device comprising the signal isolation control apparatus as set forth above in relation to the first aspect of the invention, the duplexer apparatus as set forth above in relation to the second aspect of the invention, and/or the transceiver apparatus as set forth above in relation to the third aspect of the invention.

According to a fifth aspect of the present invention, there is provided a method of controlling a hybrid junction for duplexing signals to be transmitted through and received from an antenna, the hybrid junction comprising an input node for receiving a transmission signal, an antenna node for coupling to the antenna, an output node for outputting a received signal from the antenna and a balance node, the method comprising: tapping a transitory transmit signal off a transmitter chain; providing an auxiliary transmitter chain; the auxiliary transmitter chain receiving the transitory transmit signal and generating a feedforward isolation signal to maximize isolation of the output node of the hybrid junction from the input node of the hybrid junction; and applying the feedforward isolation signal to the balance node.

It is thus possible to provide a signal isolation control apparatus, a duplexer apparatus, a wireless transceiver apparatus and methods therefor that can provide the isolation signal at the balance node in an adaptable manner depending upon the response of the antenna, thereby enabling operation across a wide range of frequency bands.

As the adaptation of the hybrid junction, in respect of different frequency bands, can be carried out in the digital domain where signal processing is much easier to implement than in the analogue domain, reliance upon switching or configuring of physical impedances can be avoided. Consequently, greater efficiency can be achieved by way of minimising components required for manufacture and power losses associated therewith in relation to adapting dynamically a transceiver apparatus to different frequency bands.

Furthermore, since the adaptation scheme employed to generate the isolation signal attempts to eliminate feedthrough of the transmission signal to the output node, regardless of coupling mechanism, the adaptation scheme also compensates for imperfections in the non-ideal hybrid junction.

Due to frequency domain equalization being a vector multiplication of two complex vectors, this simplifies processing since operation on a signal post-subcarrier mapping is a relatively simple operation. As such, it is thus possible to provide a range of possible adaptations to support a wide range of frequency bands, because generation of the isolation signal can follow a similar scheme to a normal transmission chain employed. For example, for SC-FDMA modulation for LTE, the adaptive filter is effectively the frequency-domain equaliser.

Also, by comparing the leaked signal with the tapped transmit signal throughout a period of detection of the presence of the tapped transmitter chain signal, it is possible to update regularly the isolation signal in order to account for variations in the reflection coefficient at the antenna node with time.

Furthermore, the value of the impedance at the balance node of the hybrid junction can thus be brought closer to the impedance value at the antenna node, thereby increasing the passive isolation between the input node and the output node of the hybrid junction and so reduce power drive requirements for the isolation signal and improve overall isolation between the input node and the output node.

Additionally, by providing an impedance coupled to the balance node, any power arriving at the balance node of the hybrid junction does not need to be absorbed or dissipated in the apparatus.

BRIEF DESCRIPTION OF THE DRAWINGS

At least one embodiment of the invention will now be described, by way of example only, with reference to the accompanying drawings, in which.

DETAILED DESCRIPTION OF THE INVENTION

Figure 1:
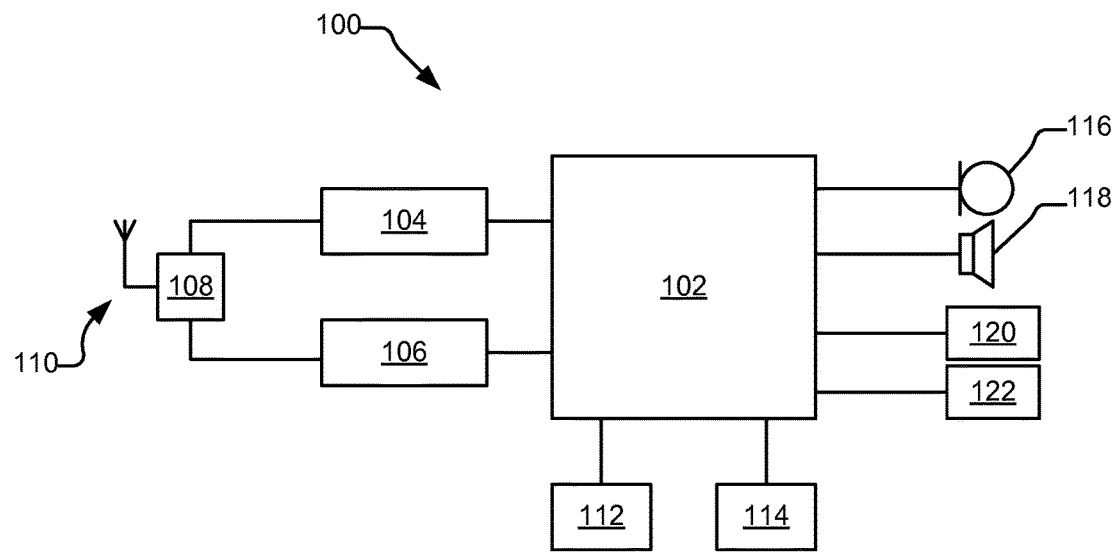
FIG. 1 is a schematic diagram of a user equipment device constituting an embodiment of the invention.

Throughout the following description identical reference numerals will be used to identify like parts.

Referring to FIG. 1, a user equipment (UE) device 100 operating in an LTE communications system, comprises a processing resource 102, the processing resource 102 being, in this example, a chipset of a cellular communications terminal. The processing resource 102 is coupled to a transmitter chain 104 and a receiver chain 106, the transmitter and receiver chains 104, 106 being coupled to a duplexing apparatus 108. The duplexing apparatus 108 is coupled to an antenna 110.

The UE device 100 also possesses a volatile memory, for example a RAM 112, and a non-volatile memory, for example a ROM 114, each coupled to the processing resource 102. The processing resource 102 is also coupled to a microphone 116, a speaker unit 118, a keypad 120 and a display 122. The skilled person should appreciate that the architecture of the UE device 100 described above comprises other elements, but such additional elements have not been described herein for the sake of preserving conciseness and clarity of description.

Figure 2:
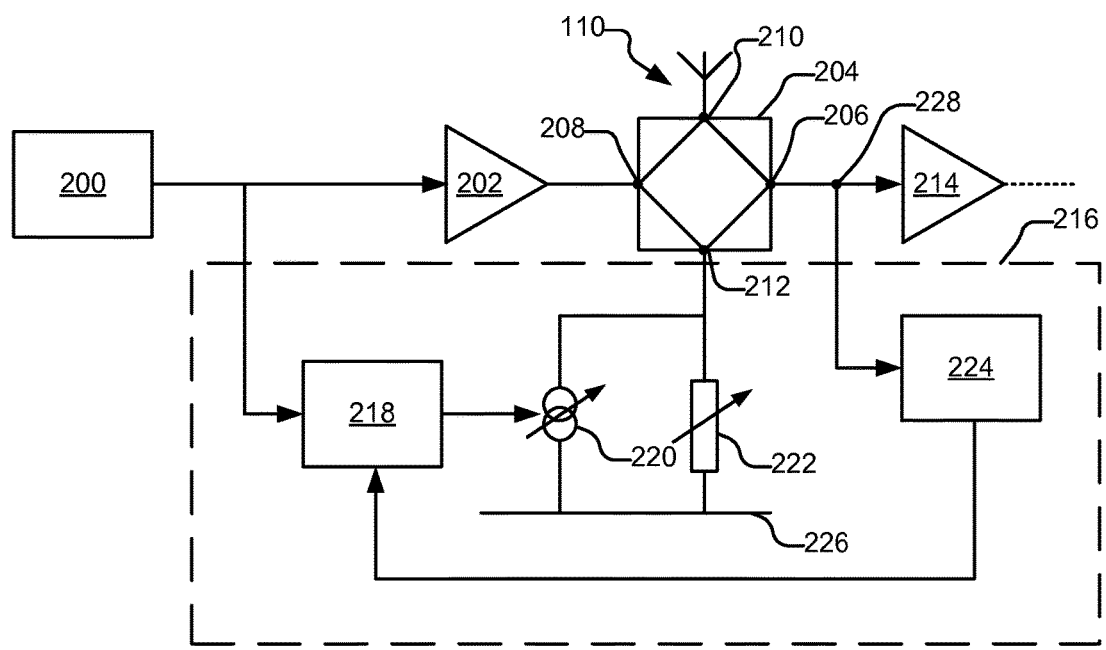
FIG. 2 is a schematic diagram of a part of a transceiver apparatus used by the user equipment device of FIG. 1 and constituting another embodiment of the invention.

Turning to FIG. 2, in a transceiver, the transmitter chain 104 of FIG. 1 comprises a transmit modulator unit 200 and a power amplifier 202. An output of the transmit modulator unit 200 is operably coupled to an input of the power amplifier 202.

The duplexing apparatus 108 depicted in FIG. 1 comprises a hybrid junction 204 having an output node 206, an input node 208, an antenna node 210 and a balance node 212. Herein, when used with respect to the hybrid junction 204, the terms "input node" and "output node" are expressed from the perspective of the hybrid junction 204 being the point of reference. The output node 206 is coupled to an input of a low-noise amplifier 214, the receiver chain 106 comprising the low-noise amplifier 214 and subsequent processing stages (not shown). The antenna 110 is operably coupled to the antenna node 210. The duplexing apparatus 108 also comprises a signal isolation control apparatus 216 operably coupled to the hybrid junction 204, the transmit modulator unit 200 and the power amplifier 202 in the following manner.

The signal isolation control apparatus 216 comprises an adaptive filter unit 218, a controllable current source 220, an impedance 222 and a signal monitoring unit 224. A signal input of the adaptive filter unit 218 is operably coupled to the output of the transmit modulator unit 200 and the input of the power amplifier 202. A leaked signal monitoring input of the adaptive filter unit 218 is operably coupled to a monitoring output of the signal monitoring unit 224. In this example, the signal monitoring unit 224 is a measuring receiver operating at the transmit frequency and comprising a complex down-converter (not shown). The measuring receiver is capable of operating over the full bandwidth of the transmitted and received signals and receiver-processes any signal received by the measuring receiver, because any signal leakage from the input node 208 to the output node 206 of the hybrid junction 204 needs to be characterised in order to derive the response in terms of signal leakage of the hybrid junction 204. A control output of the adaptive filter unit 218 is operably coupled to a control input of the controllable current source 220.

A first terminal of the controllable current source 220 is coupled to the balance node 212 of the hybrid junction 204 and a second terminal of the controllable current source 220 is coupled to a common rail 226 at, for example, ground potential. In this example, the controllable current source 220 is a transconductance amplifier. However, the controllable current source 220 can be implemented using any suitable known circuit to provide an isolation signal of the kind to be described later herein. The impedance 222 also has a first terminal operably coupled to the balance node 212 and a second terminal coupled to the common rail 226. An input of the signal monitoring unit 224 is operably coupled to a tapping point 228 between the output node 206 of the hybrid junction 204 and the input of the low-noise amplifier 214, via a signal leakage monitoring input (not shown) of the apparatus 216.

In order to better understand operation of the duplexer apparatus 108, the principle of operation of an ideal and then a non-ideal hybrid junction will now be described. For an ideal hybrid junction, it can be shown mathematically that when a reflection coefficient connected to the balance node 212 is equal or "matched" to a reflection coefficient connected to the antenna node 210, signal isolation between the output node 206 and the input node 208 can be achieved, namely a transmission signal, $\hat{S}_{TX}$, at the input node 208 is divided equally between the antenna node 210 and the balance node 212 and none of the transmission signal, $\hat{S}_{TX}$, reaches the output node 206 and hence the low-noise amplifier 214. In the system shown, the impedance 222 would ideally meet this condition if it equalled the antenna impedance. In practical cases, however, the antenna impedance will be frequency varying and not equal to its ideal characteristic impedance so a given impedance 222 will not meet this condition.

In order to make the reflection coefficients at the antenna node 210 and at the balance node 212 equal, a signal, hereinafter referred to as an isolation signal, needs to be injected into the balance node 212 from the signal isolation control apparatus 216. It will be appreciated that the controllable current source 220 does not of itself affect the impedance 222 as it has infinite parallel impedance, but the effective impedance may be changed by injecting current signals which are derived from the transmit signal such that the aggregate signal at the balance port 212 is equivalent to the signal reflected back into the hybrid junction 204 from the antenna node 210.

It should be appreciated that in some examples, the design of the hybrid junction 204 can be such that balance of the hybrid junction 204 is attained by the isolation signal being a proportion of or a multiple of the signal reflected back into the hybrid junction 204 from the antenna node 210 by introducing a deliberate "skew" into the hybrid design. This has the advantage that the proportion of the transmit signal diverted to the balance node 212 can be reduced and more power made available to the transmit node 210. Also, the amount of power needed to be generated by the isolation control apparatus 216 can be reduced.

The transfer function for such a matched hybrid junction can be derived by assuming that the antenna node 210 has an antenna node reflection coefficient $\rho_a$ associated with it and the balance node 212 has a balance node reflection coefficient $\rho_b$ associated with it. The antenna reflection coefficient $\rho_a$ is frequency dependent. The balance node is deemed matched, but the "load" is active and can generate an incident wave, $a_b$. For simplicity, it is also assumed that the input and output nodes 208, 206, respectively are also matched.

The reflected wave amplitudes are then given by the following product of the incident wave amplitudes with a scattering matrix:

$$\begin{pmatrix} b_o \\ b_a \\ b_i \\ b_b \end{pmatrix} = \begin{bmatrix} 0 & k & 0 & k' \\ k & 0 & k' & 0 \\ 0 & k' & 0 & -k \\ k' & 0 & -k & 0 \end{bmatrix} \begin{pmatrix} a_o \\ \rho_a b_a \\ 0 \\ a_b \end{pmatrix}$$

where $a_o$ is an incident wave at the input node 208, $a_b$ is an incident wave at the balance node 212, $b_o$ is a reflected wave at the input node 208, $b_a$ is a reflected wave at the antenna node 210, $b_i$ is a reflected wave at the output node 206, $b_b$ is a reflected wave at the balance node, and k and k' are coupling coefficients. Since the hybrid junction 204 is assumed lossless, $k^2+k'^2=1$. For equal power division, $$k = k' = \frac{1}{\sqrt{2}}.$$

Interchanging the third and fourth columns of the scattering matrix, then the third and fourth rows of the scattering matrix, and changing the order of the components of the column vectors accordingly, yields:

$$\begin{pmatrix} b_o \\ b_a \\ b_b \\ b_i \end{pmatrix} = \begin{bmatrix} 0 & k & k' & 0 \\ k & 0 & 0 & k' \\ k' & 0 & 0 & -k \\ 0 & k' & -k & 0 \end{bmatrix} \begin{pmatrix} a_o \\ \rho_a b_a \\ a_b \\ 0 \end{pmatrix}$$

From this:

$$\begin{pmatrix} b_o \\ b_a \\ b_b \end{pmatrix} = \begin{bmatrix} 0 & k & k' \\ k & 0 & 0 \\ k' & 0 & 0 \end{bmatrix} \begin{pmatrix} a_o \\ \rho_a b_a \\ a_b \end{pmatrix} + \begin{bmatrix} 0 \\ k' \\ -k \end{bmatrix} 0, \text{ and}$$

$$b_i = k'\rho_a b_a - k a_b$$

For isolation, we want $b_i$ to be zero, for which:

$$k'\rho_a ka_o = ka_b, \text{ and from which}$$

$$a_b = k'\rho_a a_o$$

Thus, the transfer function required is simply $k'\rho_a$.

However, the skilled person will appreciate that, in practice, the performance of the hybrid junction 204 is not ideal. As such, the hybrid junction 204 is subject to other coupling mechanisms resulting in signal leakage from the input node 208 to the output node 206, additional to the signal reflected at the antenna node 210 and the balance node 212.

Figure 3:
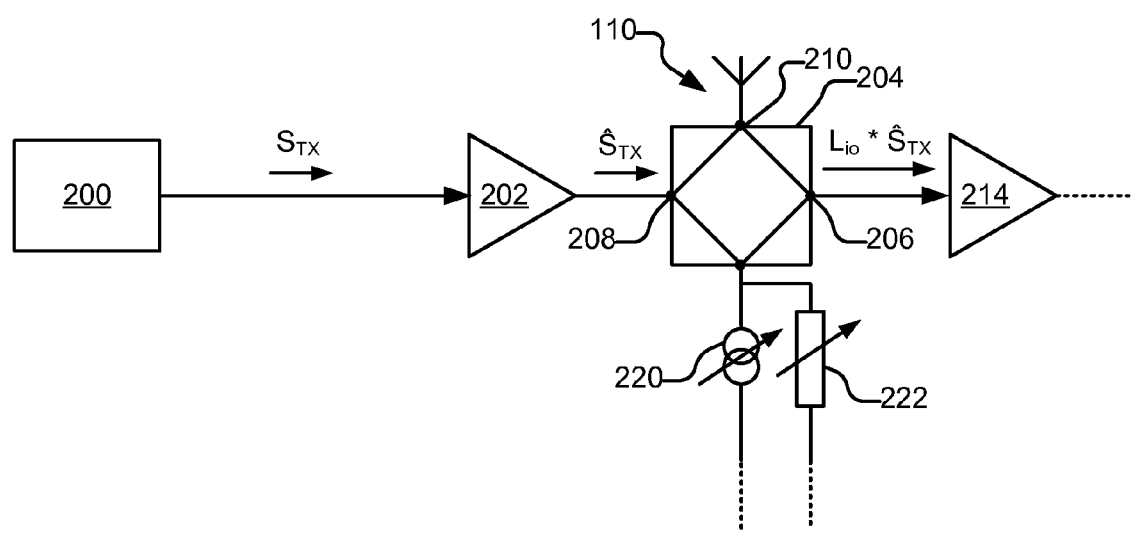
FIG. 3 is a schematic diagram of signal leakage in a hybrid junction device of FIG. 2.

Referring to FIG. 3, in operation, an upconverted modulated baseband signal, $S_{TX}$, is generated by the transmit modulator unit 200. This upconverted signal, $S_{TX}$, is amplified by the power amplifier 202 to yield an amplified signal (the transmission signal), $\hat{S}_{TX}$, at the output of the power amplifier 202 and hence at the input node 208 of the hybrid junction 204. Due to the leakage mechanisms mentioned above, some of the transmission signal, $\hat{S}_{TX}$, is filtered with a leakage transfer function, $L_{io}$, in respect of the signal leakage from the input node 208 to the output node 206, which yields a leaked signal, $L_{io}*\hat{S}_{TX}$, at the output node 206 of the hybrid junction 204.

Referring back to FIG. 2, the transmission signal, $\hat{S}_{TX}$, applied to the input node 208 is divided, depending upon the configuration of the hybrid junction 204, between the antenna node 210 and the balance node 212. The impedance 222, in this example a resistance, is used to sink, for example dissipate, the majority of the power attributable to the divided transmission signal. This obviates the need for another part of the signal isolation control apparatus 216 to dissipate this majority of the signal. In the context of an ideal or near-ideal hybrid junction, where the impedance 222 is such that it is substantially equal to the characteristic impedance of the hybrid junction 204, the component of the transmission signal at the balance node 212 is absorbed and so, in order to place the hybrid junction 204 into a balanced state, it is necessary to inject the isolation signal mentioned above into the balance node 212. It has been discovered that it is necessary to arrange the isolation signal such that it is substantially equal, but in antiphase, to the other component of the transmission signal reflected from the antenna node 210, so that the effective reflection coefficient seen at the balance node 212 is substantially equal to the reflection coefficient at the antenna node 210. Such an approach allows control of the effective reflection coefficient at the balance node 212 over a wider band of frequencies than by using a tuneable impedance alone. For example, if the impedance 222 generates a reflection coefficient exactly equivalent to the reflection coefficient at the antenna node 210 then no additional balance signal, serving as an isolation signal, is required to be generated by the controllable current source 220. If the impedance does not generate such an equivalent reflection coefficient, then the controllable current source 220 needs to provide a current that in effect changes the impedance, and hence the reflection coefficient, at the balance node 212 so as to be substantially equal to the antenna reflection coefficient at the antenna node 210.

In another example, the impedance 222 can be adaptive, for example by using a bank of switched resistors controlled by, for example, a controller (not shown) of the adaptive filter unit 218. Of course, this is just one example and any suitable means of impedance tuning can be contemplated using, for example switchably selectable fixed capacitors and/or inductors in addition to resistors to control the impedance. However, by making the impedance seen at the balance node 212 closer to the impedance seen at the antenna node 210, it is possible to increase the inherent isolation between the input node 208 and the output node 206 of the hybrid junction 204, thereby reducing the required power of the isolation signal to be injected into the balance node 212 and can also increase the overall isolation between the input node 208 and the output node 206 of the hybrid junction 204. For example, the impedance 222 can be 25, 50 and 100 ohm resistors to minimise drive requirements up to a 2:1 Voltage Standing Wave Ratio (VSWR).

Figure 4:
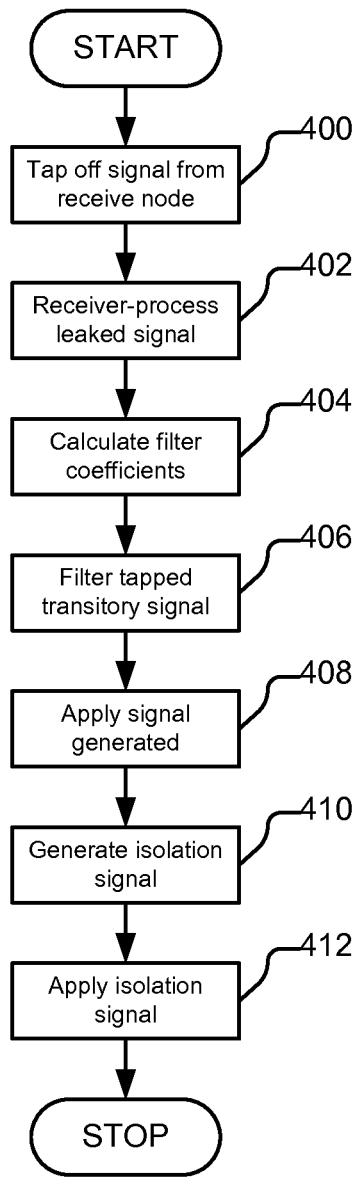
FIG. 4 is a flow diagram of operation of a duplexing function of the transceiver apparatus of FIG. 2 and constituting a further embodiment of the invention.

In operation (FIG. 4), the adaptive filter unit 218 is adjusted using a monitoring signal, constituting a receive feedback signal, at the monitoring output of the signal monitoring unit 224 in order to control generation of the isolation signal. In this respect, the signal monitoring unit 224 taps off (Step 400) a portion of the leaked signal present at the output node 206 of the hybrid junction 204 and serves as a monitoring receiver circuit operating over a transmit frequency band associated with the transmission signal, $\hat{S}_{TX}$, in order to receiver-process the portion of the leaked signal, thereby providing a measure (Step 402) of the leaked signal at the output node 206 of the hybrid junction 204. The monitoring signal serves to guide (Step 404) the adaptive filter unit 218 in the adaptation of filter coefficients applied by the adaptive filter unit 218, thereby determining the isolation signal. The adaptive filter unit 218 contributes to generation (Step 406) of the isolation signal by filtering, and thus modifying, the tapped portion of the upconverted modulated signal, $S_{TX}$. The signal generated by the adaptive filter unit 218 is then applied (Step 408) to the controllable current source 220, which generates (Step 410) the isolation signal that is fed forward and applied (Step 412) to the balance node 212 of the hybrid junction 204, thereby maximising isolation of the input node 208 from the output node 206.

The above example relates to a processing implementation in the frequency domain, but it should be appreciated that for some applications the adaptive filtering can alternatively be performed in the time domain. However, in order to mitigate further the leakage signal attributable to the other, non-balance related, coupling mechanisms.

Figure 5:
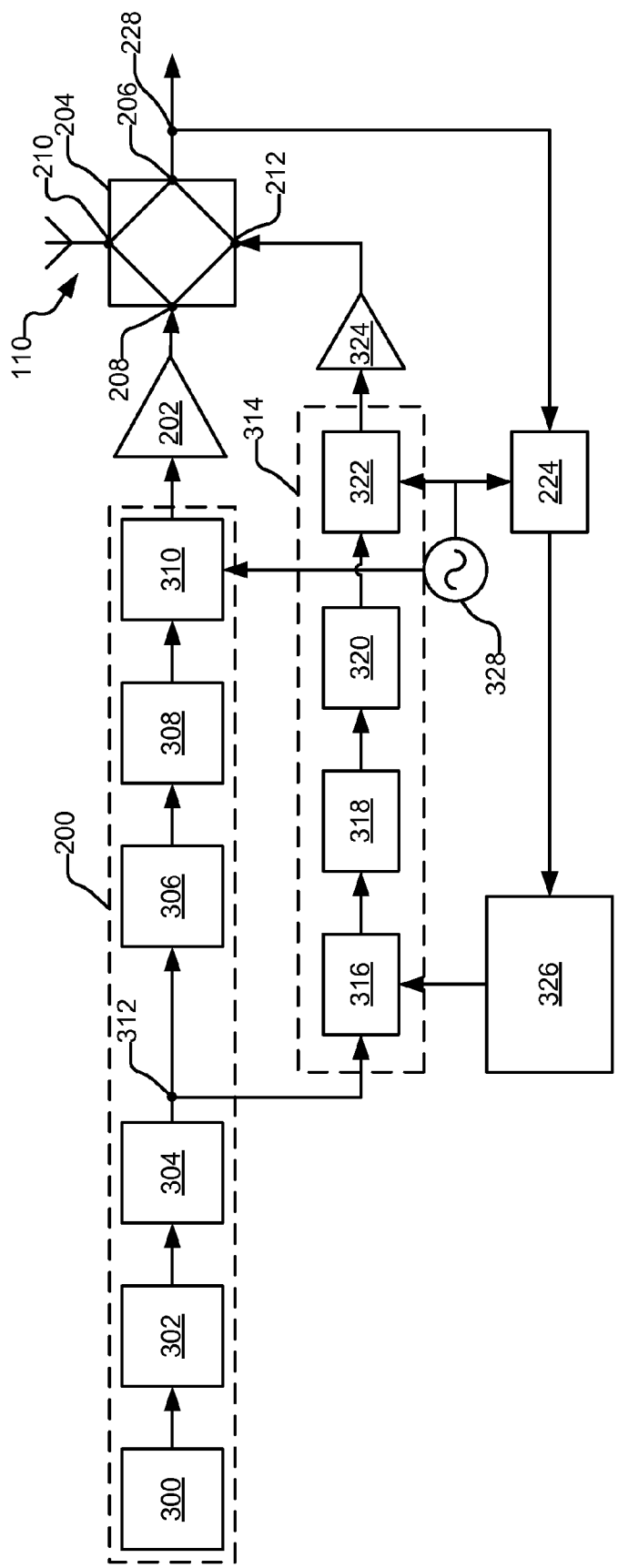
FIG. 5 is a schematic diagram of the transceiver apparatus of FIG. 2 in greater detail.

Referring to FIG. 5, the transmit modulator unit 200 for a Single-Carrier Frequency Division Multiple Access waveform specified for the LTE communications system comprises a data mapper 300 operably coupled to a waveform generator 302. The waveform generator 302 is operably coupled to a digital Fourier transform unit 304, the digital Fourier transform unit 304 being an M-point digital transform unit. A subcarrier mapping unit 306 is operably coupled to the digital Fourier transform unit 304 and an N-point inverse fast Fourier transform unit 308, where N is greater than M. The inverse Fourier transform unit 308 is operably coupled to an up-converter 310, which has an output that is operably coupled to the input of the power amplifier 202.

In this example, a signal in the transmitter chain is, when in use, tapped by way of copying. In this respect, a tapping point 312 is located at the output of the digital Fourier transform unit 304 and is coupled to an auxiliary transmitter chain 314 of the apparatus 216, the auxiliary transmitter chain 314 comprising transmitter chain processing stage units, for example a Frequency Domain Equaliser (FDE) 316 having an input thereof coupled to the tapping point 312 and an output operably coupled to an input of an auxiliary subcarrier mapping unit 318. In the examples set forth herein, the input of the frequency domain equalizer 316 constitutes a transmitter chain tap input of the apparatus 216 and is a set of M Fourier components representing the symbol signal being transmitted. A "leakage channel" between the input node 208 and the output node 206 of the hybrid junction 204, and a "cancellation channel" between the balance node 212 and the output node 206, are estimated by an adaptation signal processor 326 in a manner described later herein. These channel estimates are used to determine coefficients for the FDE 316 in a manner described later herein. The FDE 316 can be implemented as a complex coefficient vector representing a frequency domain transfer function, for example a set of M complex coefficients that encode the amplitude and phase of the frequency domain transfer function at each of the M frequencies of the Fourier components of the tapped transitory signal. The frequency domain equaliser 316 serves to perform, when in use, a point-by-point multiplication of each Fourier component of the tapped transitory signal with the corresponding complex FDE coefficient mentioned above in order to generate M modified Fourier components that can be input to the auxiliary subcarrier mapping unit 318.

An output of the auxiliary subcarrier mapping unit 318 is operably coupled to an input of an auxiliary N-point inverse fast Fourier transform unit 320, an output of which is operably coupled to an input of an auxiliary up-converter 322. An output of the auxiliary up-converter 322 is operably coupled to an input of an auxiliary power amplifier 324, constituting a current source. An output of the auxiliary power amplifier 324 is coupled to the balance node 212 of the hybrid junction 204. In this example, an adaptation signal processor 326 constituting a coefficient processor is operably coupled to the frequency domain equaliser 316 and together they serve as the adaptive filter unit 218. The adaptation signal processor 326 is also operably coupled to the monitoring output of the signal monitoring unit 224, and can also be operably coupled to the tapping point 312 depending upon whether the adaptation signal processor 326 is relying upon a mathematical methodology requiring the tapped transient signal. A local oscillator 328 is operably coupled to the up-converter 310, the auxiliary up-converter 322 and the signal monitoring unit 224. As can be seen, the transmitter chain processing stage units serve to complete processing of the tapped transitory signal in accordance with a desired modulation scheme, for example OFDM.

Figure 6:
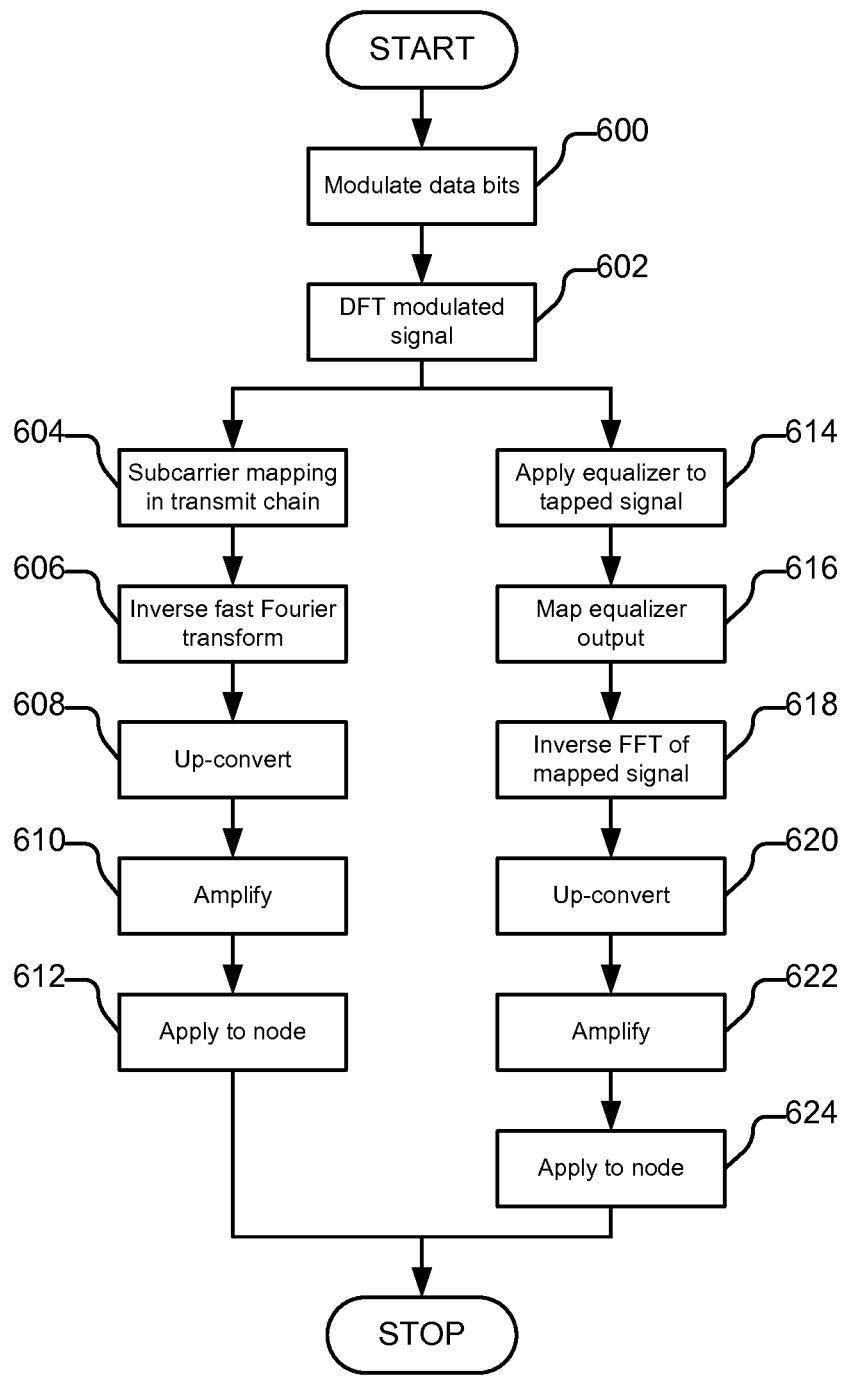
FIG. 6 is a flow diagram of a method of controlling a hybrid junction for duplexing signals constituting yet another embodiment of the invention.

In operation, (FIG. 6), a block of M data bits is Quadrature Amplitude Modulation (QAM) modulated (Step 600) onto a carrier signal at a zero centre frequency using the data mapper 300 and the waveform generator 302. The modulated carrier signal is then subjected to a discrete Fourier transform (Step 602) by the digital Fourier transform unit 304 to generate a set of M equally-spaced adjacent subcarriers of amplitude and phase that correspond to the QAM waveform repetitively, occupying a bandwidth of M×15 kHz in accordance with the LTE standard. The set of adjacent subcarriers is then mapped (Step 604) by the subcarrier mapping unit 306 onto part of a larger set of N subcarriers that span the full bandwidth of the LTE standard. After mapping, the full set of N subcarriers is subjected to an inverse fast Fourier transform (Step 606) by the inverse Fourier transform unit 308 to generate a time-domain waveform that is then up-converted (Step 608) by the up-converter 310 to form an RF signal. The up-converted RF signal is then amplified (Step 610) by the power amplifier 202 before being applied (Step 612) at the input node 208. Although the user equipment 100 comprises the receiver chain 106, the operation of this part of the user equipment 100 does not relate directly to the operation of the examples of the invention set forth herein and so, for the sake of clarity and conciseness of description, will not be described in further detail.

The transmitter chain processing stage units of the auxiliary transmitter chain 314 reproduces the processing of at least part of the transmit modulator unit 200 and the power amplifier 202. The amount of processing replicated depends upon the stage in the processing performed by the transmit modulator unit 200 where a transitory signal is tapped off from a tapping point in the transmit modulator unit 200 and hence the transmitter chain 200, 202 (104). In this example, the tapped transitory signal constitutes processing by the transmit modulator unit 200 up to and including the execution of the discrete Fourier transform performed by the digital Fourier transform unit 304.

The auxiliary transmitter chain 314 replicates the processing performed by the subcarrier mapping unit 306, the N-point inverse fast Fourier transform unit 308, and the up-converter 310. In this respect, the modulation scheme is being adapted to generate the isolation signal, the auxiliary transmit chain 314 providing, in this example, at least the same remaining processing stages as the transmitter chain 104. In order to generate the isolation signal, the transmit modulator unit 200 of the user equipment 100 initially generates (Step 650, FIG. 7), during a suitable time period to enable at least an initial set of frequency domain equalisation coefficients to be generated, a sounding or training signal, constituting a test signal, with a suitable spectrum to probe the response of the hybrid junction 204 in respect of signal leakage. This test signal can be used prior to a non-test transmission signal being transmitted. The frequency domain equalisation coefficients are generated based upon the operation of the hybrid junction 204 providing the leakage channel (hereinafter referred to as the "self-interference channel") and the so-called "cancellation channel" mentioned above.

In this respect, the leakage of the hybrid junction is considered as the notional self-interference channel and the effect of this channel needs to be measured and this is achieved by initially transmitting the sounding signal, $S_{TX1}(\omega)$, using the transmitter chain 104, a first leaked signal, $S_{RX1}(\omega)$, being present at the output node 206 of the hybrid junction 204 in response to the application of the sounding signal, $S_{TX1}(\omega)$.

The first leaked signal, $S_{RX1}(\omega)$, is the result of the influence of the self-interference channel on the transmitted sounding signal, $S_{TX1}(\omega)$, characterised by an input/output transfer function, $L_{IO}(\omega)$, defining the response of the self-interference channel in respect of the input node 208 receiving the sounding signal, $S_{TX1}(\omega)$, as a stimulus and the output node 206 providing the leaked signal, $S_{RX1}(\omega)$, in response thereto. This can be expressed as follows.

$$S_{RX1}(\omega) = L_{IO}(\omega) S_{TX1}(\omega)$$

Thus, by re-arranging this expression, an expression for the transfer function, $L_{IO}(\omega)$, is obtained.

$$L_{IO}(\omega) = \frac{S_{RX1}(\omega)}{S_{TX1}(\omega)}$$

It is also necessary to estimate the effect of the cancellation channel of the hybrid junction 204 on a stimulus applied to the balance node 212. In this respect, the notional cancellation channel between the balance node 212 and the output node 206 is measured by applying the sounding signal, $S_{TX2}(\omega)$, at the balance node 212 via the auxiliary transmitter chain 314, whilst the transmitter chain 104 is set so as not to apply any signal at the input node 208. In this respect, where the sounding signal, $S_{TX2}(\omega)$, is applied through the auxiliary transmitter chain 314, the cancellation channel can be characterised by a cancellation transfer function, $L_{BO}(\omega)$, defining the response of the cancellation channel in respect of the balance node 208 receiving the isolation signal as a stimulus and the output node 206 providing a second leaked signal, $S_{RX2}(\omega)$, in response thereto. This can be expressed as follows.

$$S_{RX2}(\omega) = L_{BO}(\omega) S_{TX2}(\omega)$$

Thus, by re-arranging this expression, an expression for the transfer function, $L_{BO}(\omega)$, of the cancellation channel, is obtained.

$$L_{BO}(\omega) = \frac{S_{RX2}(\omega)}{S_{TX2}(\omega)}$$

For a leaked transmission signal, $S_{TX3}(\omega)$, i.e. a transmission signal that will be leaked by the hybrid junction 204 between the input and output nodes thereof, to be cancelled by the isolation signal, $I_{TX}(\omega)$, at the output node 206, the sum of the two signals must be zero:

$$S_{TX3}(\omega) L_{IO}(\omega) + I_{TX}(\omega) L_{BO}(\omega) = 0 \quad (1)$$

The isolation signal, $I_{TX}(\omega)$, is generated by multiplying the transmission signal, $S_{TX3}(\omega)$, by the transfer function, $FDE(\omega)$, of the frequency domain equalizer 316.

$$I_{TX}(\omega) = FDE(\omega) S_{TX3}(\omega)$$

Substituting this expression into equation (1) above:

$$S_{TX3}(\omega) L_{IO}(\omega) + FDE(\omega) S_{TX3}(\omega) L_{BO}(\omega) = 0$$

This equation can be rearranged in order to obtain an expression for the transfer function of the frequency domain equalizer 316.

$$FDE(\omega) = -\frac{S_{TX3}(\omega) L_{IO}(\omega)}{S_{TX3}(\omega) L_{BO}(\omega)} = -\frac{L_{IO}(\omega)}{L_{BO}(\omega)}$$

Where the same sounding signal is used to measure both the self-interference channel and the cancellation channel, i.e., when $S_{TX1}(\omega) = S_{TX2}(\omega)$, then calculation of the transfer function of the frequency domain equaliser 316 can be further simplified:

$$FDE(\omega) = -\frac{L_{IO}(\omega)}{L_{BO}(\omega)} = -\frac{\frac{S_{RX1}(\omega)}{S_{TX1}(\omega)}}{\frac{S_{RX2}(\omega)}{S_{TX2}(\omega)}} = -\frac{S_{RX1}(\omega)}{S_{RX2}(\omega)}$$

The above expressions relate to a continuous frequency case. For the subcarrier equivalent case, the general expression is simply discretised:

$$FDE(\omega_k) = -\frac{L_{IO}(\omega_k)}{L_{BO}(\omega_k)}$$

Similarly, in the special case where the same sounding signal is used in respect of estimation of both the self-interference channel and the cancellation channel, i.e., when $S_{TX1}(\omega) = S_{TX2}(\omega)$, the corresponding expression can simply be discretised:

$$FDE(\omega_k) = -\frac{S_{RX1}(\omega_k)}{S_{RX2}(\omega_k)}$$

where k=1, 2, ..., N, and N is the number of subcarriers, and $\omega_k$ is the frequency of the $k^{th}$ subcarrier.

As such, the set of M subcarriers generated by the digital Fourier transform unit 304, and constituting the tapped transitory signal, is processed (Step 614) in the frequency domain equaliser 316, where essentially a vector corresponding to the subcarriers is multiplied by a complex coefficient vector constituting the transfer function $FDE(\omega_k)$ of the frequency domain equaliser 316 determined in the manner described above using the signals received at the output node 206 in response to the stimuli applied to the input node 208 and the balance node 212. In this respect, the monitoring unit 224 generates a monitoring signal, which is generated by receiver-processing a portion of the leaked signal tapped out from the output node 206 of the hybrid junction 204. The monitoring signal is used in the manner described above by the adaptation signal processor 326 to guide processing of the tapped portion of the transitory signal by the frequency domain equaliser 316.

After processing by the frequency domain equaliser 316, the processed set of M scaled subcarriers are mapped (Step 616) by the auxiliary subcarrier mapping unit 318 and then the mapped subcarriers are subjected to an inverse fast Fourier transform (Step 618) by the auxiliary inverse fast Fourier transform unit 320 before being up-converted (Step 620) into the RF domain by the auxiliary up-converter 322, the processing stages of mapping, inverse Fourier transforming and up-converting being the same as the corresponding processing stages of the transmitter chain 104. The up-converted tapped signal is then received (as an analogue signal) and amplified (Step 622) by the auxiliary power amplifier 324 and the amplified RF signal (the isolation signal) generated by the auxiliary power amplifier 324 is applied (Step 624) to the balance node 212 of the hybrid junction 204. Thus, the auxiliary transmitter chain 314 (and the frequency domain equalizer 316) modifies the tapped portion of the transitory signal.

Figure 7:
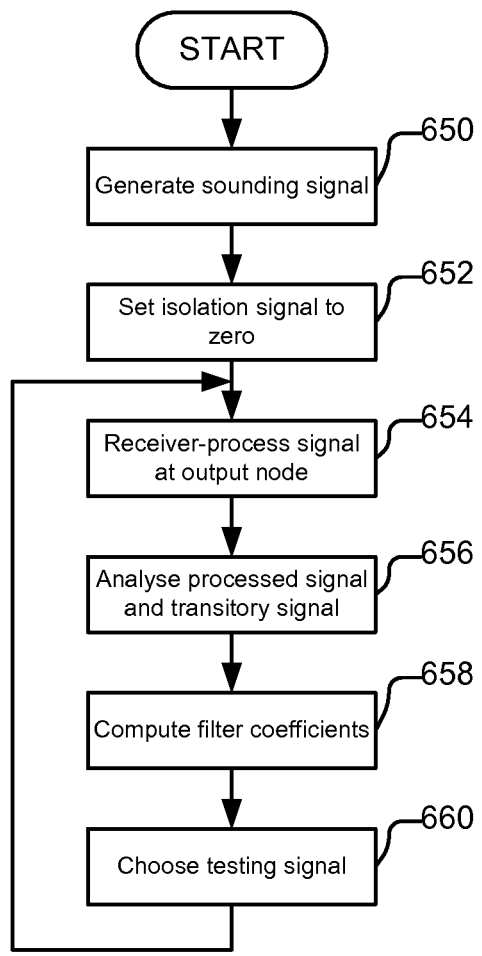
FIG. 7 is a flow diagram of a method of setting filter coefficients employed by the transceiver apparatus of FIG. 5.

Referring to FIG. 7, whilst the transmission signal, in the form of the processed sounding signal, is being applied to the input node 208 of the hybrid junction 204 and hence the antenna 110, the isolation signal is set (Step 652) to zero, so that the balance node 212 of the hybrid junction 204 is effectively terminated by the impedance 222 (not shown in FIG. 5). The leaked signal tapped from the output node 206 of the hybrid junction 204 is then effectively the transmission signal (the sounding signal initially) applied to the input node 208 of the hybrid junction 204 as filtered by a transfer function characterising (an approximation of an estimate of) the coupling of an unwanted signal to the output node 206 (irrespective of coupling mechanism(s)). In this respect, leakage between the input node 208 and the output node 206 measured herein may encompass all leakage mechanisms between the input node and the output node, including but not limited to the leakage due to impedance mismatch between the antenna node 210 and the balance node 212, and other direct and indirect coupling between the input node 208 and the output node 206 that arises owing to the non-ideal nature of the hybrid junction 204. The isolation signal generated as a result of the measured leakage signal may therefore serve to eliminate or at least mitigate, through signal cancellation, signal leakage between the input node 208 and the output node 206 regardless of coupling mechanism.

The receiver-processed signal generated (Step 654) by the monitoring unit 224 is then analysed (Step 656) by the adaptation signal processor 326 along with the tapped portion of the transitory signal (associated with the original sounding signal) in order to compute (Step 658) the above-mentioned initial set of frequency domain equalisation coefficients to be applied by the frequency domain equaliser 316.

Further sounding signals can then be generated and/or real data symbols used (Step 660) to improve performance of the frequency domain equaliser 316 further and/or maintain its performance (to adapt to dynamic environmental conditions). The monitoring signals generated by the signal monitoring unit 224 in response to these further signals can be correlated with the portion of the transitory signal based upon these further signals (tapped off the transmitter chain 104) in order to derive corrected frequency domain equalisation coefficients. A standard least mean squares (LMS) type of algorithm can be employed on a per subcarrier basis by the adaptation signal processor 326 to correct the frequency domain equalisation coefficients (Steps 654 to 658). As such, the adapted version of the transmission signal at the balance node 212 converges towards an optimum signal, constituting the isolation signal.

The isolation signal, applied to the balance node 212, generated using frequency domain equalizer coefficients calculated above and the improvements to the filter coefficients, serves to cause the hybrid junction 204 to isolate the input node 208 from the output node 206, when the main transmission signal is applied to the input node 208 and so the main transmission signal is coupled to the antenna node 210 of the hybrid junction 204 for transmission by the antenna 110. The determination and generation of the isolation signal continues, in this example, as long as the transitory signal is present at the tapping point 312.

Hence, it can be seen that a sounding signal can be employed to generate an initial, start-up, isolation signal and the isolation signal can be adjusted using real transmission signals, i.e. non-test transmission signals, to be applied to (and transmitted through) the hybrid junction 204.

Figure 8:
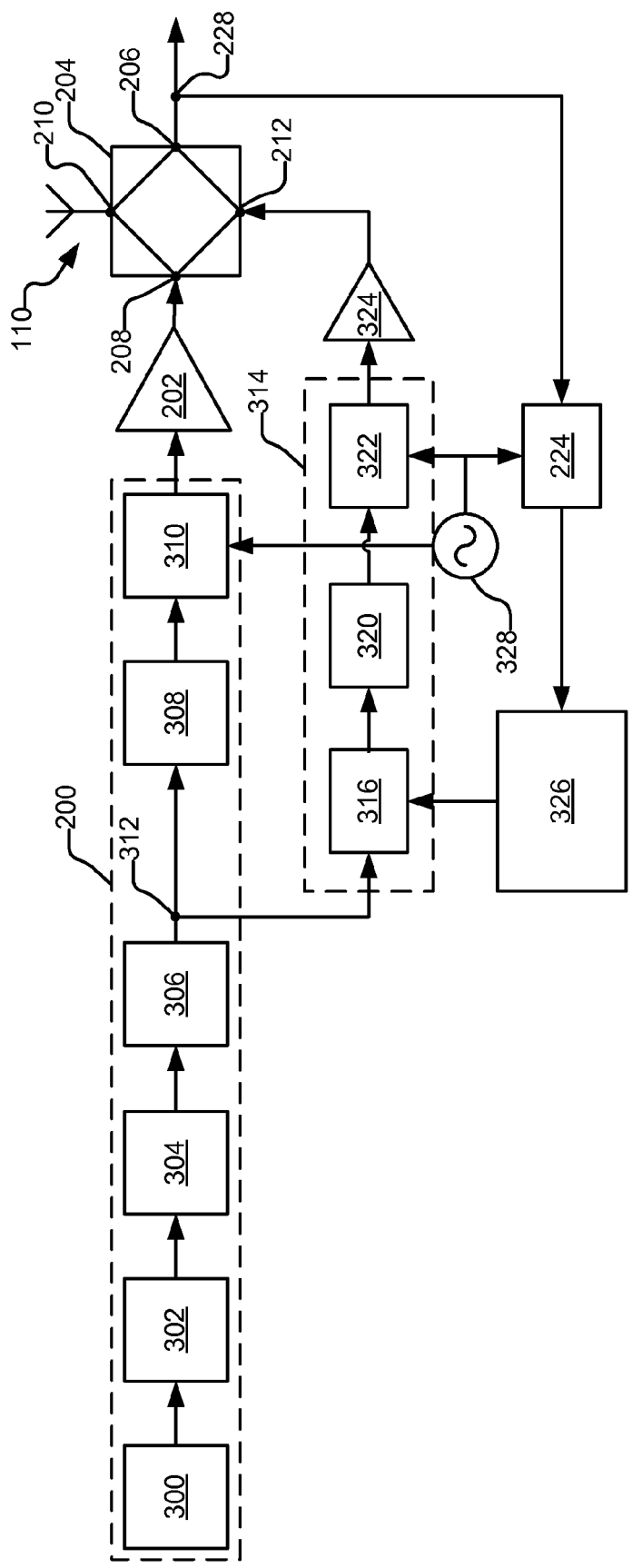
FIG. 8 is a schematic diagram of an alternative to the transceiver apparatus of FIG. 5 and constitutes another embodiment of the invention.

Referring to FIG. 8, another example of the signal isolation control apparatus is similar to the example of FIG. 5, but differs in the following ways. The portion of the transitory signal is derived from a different point in the transmitter chain 104 to the tapping out point 312 described above in relation to FIG. 5. As such, instead of the portion of the transitory signal being tapped out of the transmitter chain 200, 202 (104) at the output of the digital Fourier transform unit 304, i.e. prior to performance of the subcarrier mapping by the subcarrier mapping unit 306, the portion of the transitory signal is tapped out after the subcarrier mapping unit 306, thereby obviating the need for the auxiliary subcarrier mapping unit 318, because the subcarriers have already been processed in this way. The operation of the frequency domain equaliser 316 is modified to account for the above-mentioned changes by performing an N point multiplication rather than an M point multiplication, in which all but M of the coefficients are zero. There are thus small differences in the complexity of the approach of FIG. 5 and the approach of FIG. 8 in that in the example of FIG. 8 only one subcarrier mapping stage is required overall, but there is a slight increase in complexity to the frequency domain equaliser 316.

In operation, the signal isolation control apparatus therefore operates in a similar manner to the signal isolation control apparatus of FIG. 5, albeit with differences dictated by the structural differences described above. In this respect, the auxiliary transmitter chain 314 replicates the processing performed by the N-point inverse fast Fourier transform unit 308 and the up-converter 310, but not the subcarrier mapping unit 306. The auxiliary transmitter chain 314 again thus provides, in this example, at least the same remaining processing stages as the transmitter chain 104. The set of M mapped subcarriers output by the subcarrier mapping unit 306 constituting the tapped portion of the transitory signal is processed in the frequency domain equaliser 316, where essentially a vector corresponding to the mapped subcarriers is multiplied by the complex coefficient vector that models the response of the leakage between the input node 208 and the output node 206 of the hybrid junction 204, taking into account the more advanced stage of processing of the portion of the transitory signal applied to the input of the frequency domain equaliser 316. After processing by the frequency domain equaliser 316, the processed set of mapped subcarriers is then subjected to the inverse fast Fourier transform by the auxiliary inverse fast Fourier transform unit 320 before being up-converted to the RF domain by the auxiliary up-converter 322, the processing stages of inverse Fourier transforming and up-converting being the same as the corresponding processing stages of the transmitter chain 104. The up-converted tapped signal is then received (as an analogue signal) and amplified by the auxiliary power amplifier 324 and the amplified RF signal (the isolation signal) generated by the auxiliary power amplifier 324 is applied to the balance node 212 of the hybrid junction 204 in the same manner as described above in relation to FIG. 5. Hence, the transmitter chain processing stage units serve to complete processing of the tapped transitory signal in accordance with a desired modulation scheme.

It can be seen that the apparatus 216 estimates the response of the antenna 110 and the hybrid junction 204.

The above-described signal isolation control apparatus operates in respect of signal bandwidths no greater than the bandwidth of the intentionally transmitted signal, and so serves only to minimise the signal leakage power in the frequency band of the transmit signal. Consequently, Out-Of-Band (OOB) signal power in the transmitter chain 104 as a result of higher order effects, for example aliasing, local oscillator noise and power amplifier non-linearity, can leak across the hybrid junction 204 to the output node 206 thereof, such power residing inter alia in the receive frequency bands.

In order to mitigate the leakage of OOB signal power, the above-described examples can be modified so as deliberately to use the auxiliary transmitter chain 314 in order cancel OOB signal components in the receive frequency band as well as the transmit frequency band.

In particular, intermodulation in the power amplifier 202 between Fourier components of a signal to be transmitted results in frequency components outside the transmit frequency band. In order to mitigate such intermodulation distortions, a non-linearity is applied to the signal being processed by the auxiliary transmitter chain 314 before the auxiliary power amplifier 324; the non-linearity being applied being adaptively controlled in order to ensure generation of additional non-linear components in antiphase to the non-linear components generated by the power amplifiers 202, 324. When the introduced pre-distortions are amplified by the auxiliary power amplifier 324 to yield anti-phase non-linear components, which are spectrally coincident with corresponding non-linear components generated by the power amplifier, the principle of destructive interference can be used to cancel out the corresponding non-linear components generated in the power amplifier 202.

Figure 9:
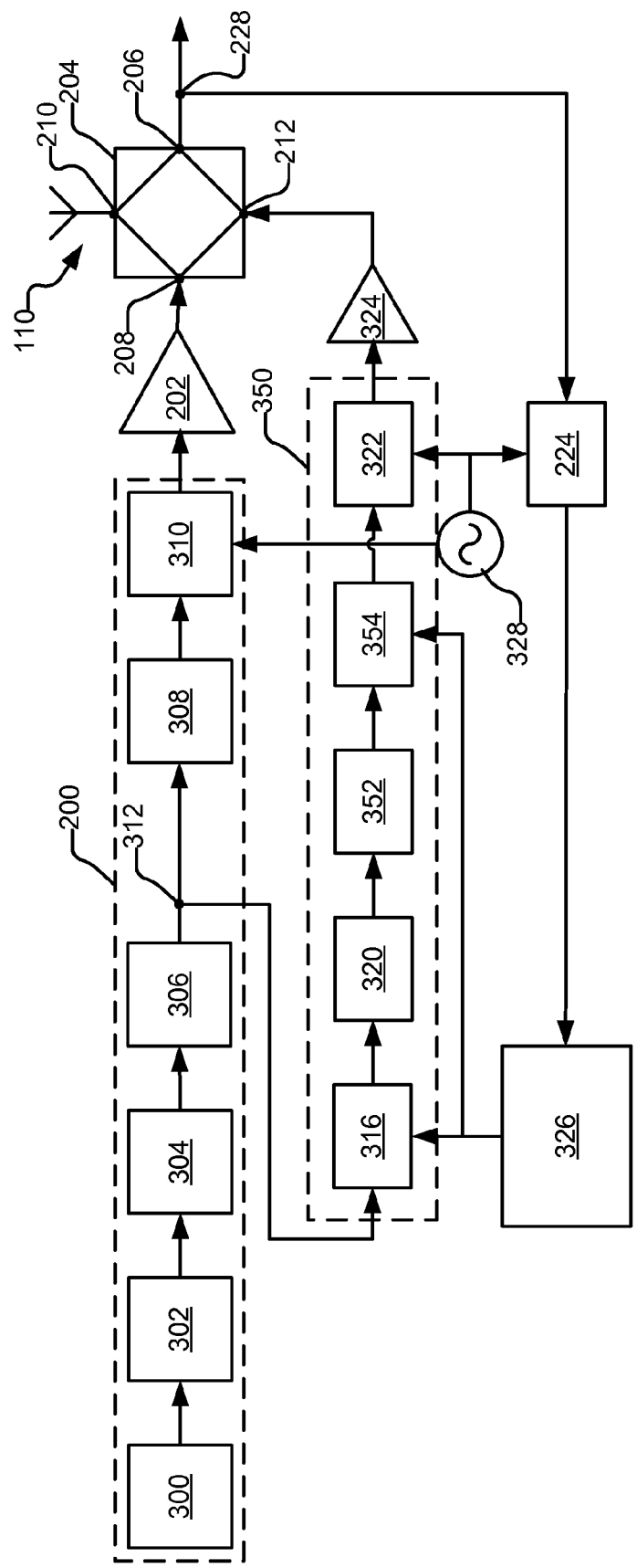
FIG. 9 is a schematic diagram of yet another alternative to the transceiver apparatus of FIG. 5 and FIG. 8 and constituting a further embodiment of the invention.

Referring to FIG. 9, in this example, the transmit modulator unit 200 of FIG. 2 comprises a data mapper 300 operably coupled to a waveform generator 302. The waveform generator 302 is operably coupled to a digital Fourier transform unit 304, the digital Fourier transform unit 304 being an M-point digital transform unit. A subcarrier mapping unit 306 is operably coupled to the digital Fourier transform unit 304 and an N-point inverse fast Fourier transform unit 308, where N is greater than M. The inverse Fourier transform unit 308 is operably coupled to an up-converter 310, which has an output that is operably coupled to the input of the power amplifier 202.

A portion of a signal in the transmitter chain is to be tapped off when the apparatus is in use. In this respect, a tapping point 312 is located at the output of the subcarrier mapping unit 306 and is coupled to a noise-cancelling auxiliary transmitter chain 350, the noise-cancelling auxiliary transmitter chain 350 comprising a frequency domain equaliser 316 having an input thereof coupled to the tapping point 312 and an output operably coupled to an input of an auxiliary N-point inverse fast Fourier transform unit 320, where N is also greater than M. A predetermined model of signal leakage of the hybrid junction 204 between the input node 208 and the output node 206 is again devised and integrated into the functionality of the frequency domain equaliser 316. The predetermined model can be implemented as a complex coefficient vector representing a transfer function.

An output of the auxiliary N-point inverse fast Fourier transform unit 320 is operably coupled to an up-sampler 352, and an output of the up-sampler 352 is operably coupled to an input of a non-linear filter 354, constituting a non-linearity generator unit. An output of the non-linear filter 354 is operably coupled to an input of an auxiliary up-converter 322, an output of the auxiliary up-converter 322 being operably coupled to an input of an auxiliary power amplifier 324. An output of the auxiliary power amplifier 324 is coupled to the balance node 212 of the hybrid junction 204. In this example, an adaptation signal processor 326 is operably coupled to the frequency domain equaliser 316, the non-linear filter 354 and the monitoring output of the signal monitoring unit 224, the adaptation signal processor 326 and the frequency domain equalizer 316, an example of an adaptive filter, serve as the adaptive filter unit 218. A local oscillator 328 is operably coupled to the up-converter 310, the auxiliary up-converter 322 and the signal monitoring unit 224.

In this example, the transmit modulator unit 200 is used to support a Single Carrier-Frequency Division Multiple Access scheme (SC-FDMA) for an uplink of an LTE communications system in which the user equipment device 100 is used.

Figure 10:
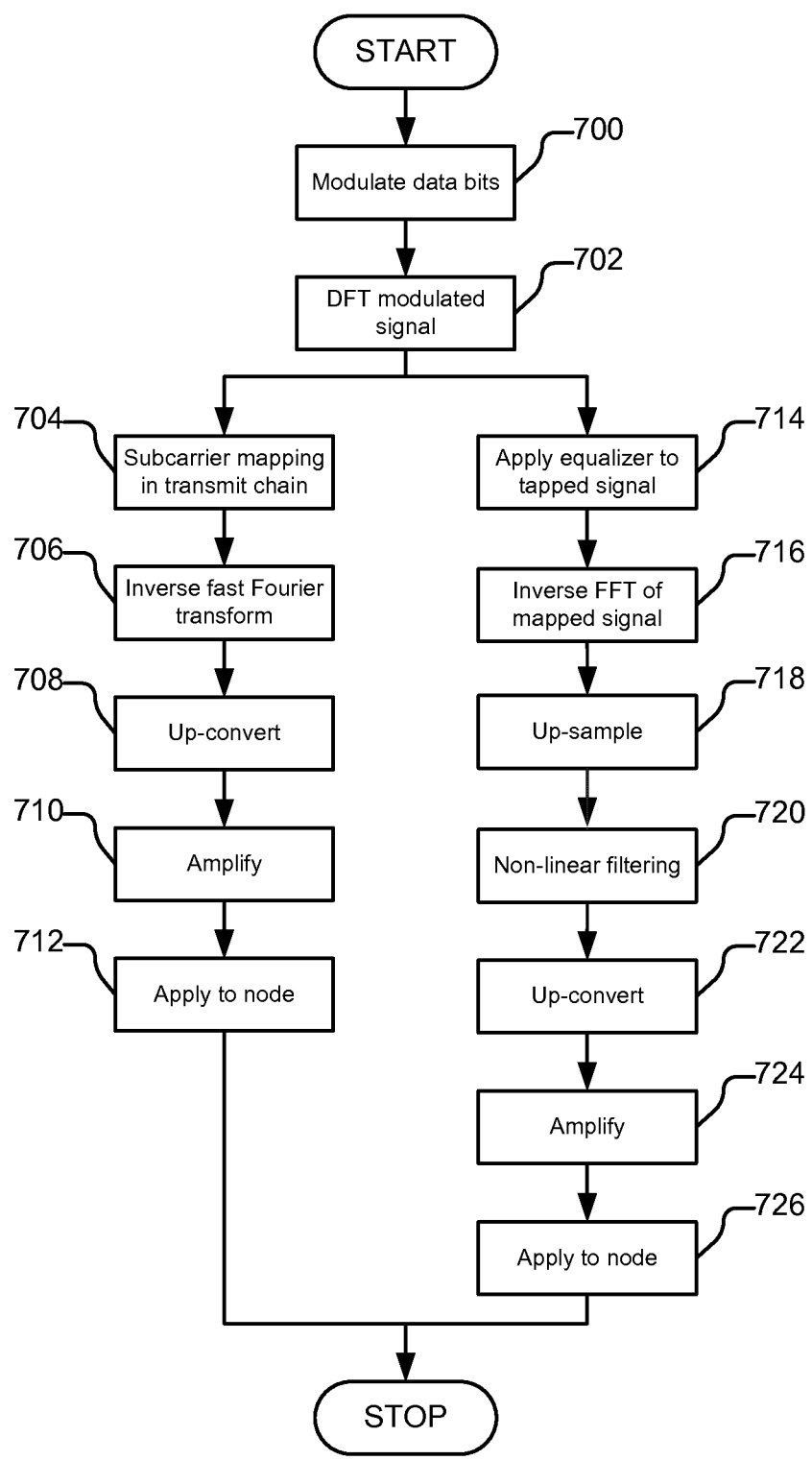
FIG. 10 is a flow diagram of another method of controlling the hybrid junction of FIG. 9 and constituting an embodiment of the invention.

In operation, (FIG. 10), a block of M data bits is QAM modulated (Step 700) onto a carrier signal at a zero centre frequency using the data mapper 300 and the waveform generator 302. The modulated carrier signal is then subjected to a discrete Fourier transform (Step 702) by the digital Fourier transform unit 304 to generate a set of M equally-spaced adjacent subcarriers of amplitude and phase that correspond to the QAM waveform repetitively, occupying a bandwidth of M×15 kHz in accordance with the LTE standard. The set of adjacent subcarriers is then mapped (Step 704) by the subcarrier mapping unit 306 onto part of a larger set of N subcarriers that span the full bandwidth of the LTE standard. After mapping, the full set of N subcarriers is subjected to an inverse fast Fourier transform (Step 706) by the inverse Fourier transform unit 308 to generate a time-domain waveform that is then up-converted (Step 708) by the up-converter 310 to form an RF signal. The up-converted RF signal is then amplified (Step 710) by the power amplifier 202 before being applied (Step 712) at the input node 208 Although the user equipment 100 comprises the receiver chain 106, the operation of this part of the user equipment 100 does not relate directly to the operation of the examples of the invention set forth herein and so, for the sake of clarity and conciseness of description, will not be described in further detail.

The noise-cancelling auxiliary transmitter chain 350 reproduces the processing of at least part of the transmit modulator unit 200 and the power amplifier 202, but also introduces non-linear signal components in order to mitigate the OOB effects caused by non-linearities of the power amplifier 202. The amount of processing replicated depends upon the stage in the processing performed by the transmit modulator unit 200 where a portion of a transitory signal is tapped off from a tapping point in the transmit modulator unit 200 and hence the transmitter chain 200, 202 (104). In this example, the portion of the transitory signal constitutes processing by the transmit modulator unit 200 up to and including the execution of the subcarrier mapping performed by the subcarrier mapping unit 306. In order to generate the isolation signal, a modem (not shown) of the user equipment 100 initially generates (Step 700, FIG. 10), during a suitable time period to enable at least an initial set of frequency domain equalisation coefficients to be generated, a sounding signal with a suitable spectrum to probe the response of the hybrid junction 204 in respect of signal leakage.

In addition to introducing the pre-distortions, the noise-cancelling auxiliary transmitter chain 350 replicates the processing performed by the N-point inverse fast Fourier transform unit 308 and the up-converter 310. In this respect, the modulation scheme is being adapted to generate the isolation signal, the auxiliary transmitter chain 314 providing, in this example, at least the same remaining processing stages as the transmitter chain 104. The set of M mapped subcarriers output by the subcarrier mapping unit 306, and constituting the tapped portion of the transitory signal, is processed (Step 714) in the frequency domain equaliser 316, where essentially a vector corresponding to the subcarriers is multiplied by the complex coefficient vector constituting the transfer function $FDE(\omega)$ of the frequency domain equaliser 316 determined in the manner described above using the signals received at the output node 206 in response to the stimuli applied to the input node 208 and the balance node 212. In this respect, the monitoring unit 224 generates a monitoring signal, constituting a receive feedback signal, which is generated by receiver-processing a portion of the leaked signal tapped out from the output node 206 of the hybrid junction 204. The monitoring signal is used in the manner described above by the adaptation signal processor 326 in order to guide processing of the tapped portion of the transitory signal by the frequency domain equaliser 316 and the non-linear filter 354.

After processing by the frequency domain equaliser 316, the processed mapped subcarriers are subjected to an inverse fast Fourier transform (Step 716) by the auxiliary inverse fast Fourier transform unit 320 before being up-sampled (Step 718) by the up-sampler 352 by an appropriate factor which depends on the order of the non-linearities being cancelled, for example 3, 5, or 7. In this respect, the up-sampler increases the sampling rate of the tapped transitory signal. The non-linear intermodulation products being generated in the power amplifier 202 extend over a frequency range that is significantly broader than the transmit frequency band, for example 3rd-order intermodulation products, generated by cubic non-linearities occupy three times more bandwidth than the transmit frequency band and 5th-order products generated by fifth power non-linearities occupy five times more bandwidth than the transmit frequency band. Consequently, the digital sampling rate of the tapped transitory signal being processed by the noise-cancelling auxiliary transmitter chain 350 therefore has to be increased by a corresponding factor to ensure that appropriate (antiphase) cancellation signals of a sufficiently wide bandwidth can be generated. The up-sampler 352 employs an interpolation technique, for example in the context of 5× up-sampling, 4 additional samples are interpolated according to a suitable filtering function, typically a sinc function. The required bandwidth of the balance signal will depend on the duplex separation.

The up-sampled signal is applied to the non-linear filter 354 and a non-linear function is applied (Step 720) to the signal received. For simple "benign" non-linearities, the non-linear function can be a memoryless polynomial. However, for systems with "memory" effects, i.e. where an instantaneous value of the output of the filter depends upon non-linearity of previous output value, the non-linear filter 354 can be, for example, a Volterra filter. In order to control the generation of the anti-phase intermodulation products, the adaptation signal processor 326 adjusts the coefficients of the non-linear filter 354 in response to the monitoring signal received from the signal monitoring unit 224. When the filter coefficients are correctly adapted, the signals appearing at the output node 206, respectively received from the input node 208 and the balance node 212 via the self-interference channel and the cancellation channel should have the same amplitude, but be in antiphase to, including in respect of the non-linear intermodulation products.

The signal output by the non-linear filter 354 comprises distortions and is then up-converted (Step 722), the processing stages of inverse Fourier transforming and up-converting being the same as the corresponding processing stages of the transmitter chain 104. The up-converted tapped signal is then received (as an analogue signal) and amplified (Step 724) by the auxiliary power amplifier 324 and the amplified RF signal (the isolation signal) generated by the auxiliary power amplifier 324 containing anti-phase intermodulation products is applied (Step 726) to the balance node 212 of the hybrid junction 204. As can be seen, the transmitter chain processing stage units serve to complete processing of the tapped transitory signal in accordance with a desired modulation scheme.

Figure 11:
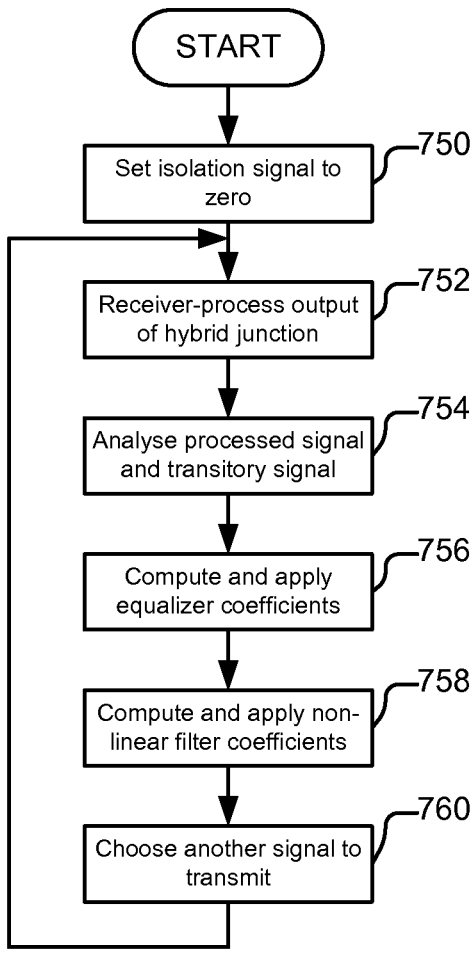
FIG. 11 is a flow diagram of another method of setting filter coefficients employed by the transceiver apparatus of FIG. 9.

Referring to FIG. 11, whilst the transmission signal, in the form of the processed sounding signal, is being applied to the input node 208 of the hybrid junction 204 and hence the antenna 110, the isolation signal is set to zero (Step 750), so that the balance node 212 of the hybrid junction 204 is effectively terminated by the impedance 222 (not shown in FIG. 9) constituting a normalising impedance. The leaked signal tapped from the output node 206 of the hybrid junction 204 is then effectively the transmission signal (the sounding signal initially) applied to the input node 208 of the hybrid junction 204 as filtered by a transfer function characterising (an approximation of an estimate of) the coupling of an unwanted signal to the output node 206 (irrespective of coupling mechanism(s)). The receiver-processed signal generated (Step 752) by the monitoring unit 224 is then analysed (Step 754) by the adaptation signal processor 326 along with the tapped portion of the transitory signal (associated with the original sounding signal) in order to compute (Step 756) the above-mentioned initial set of frequency domain equalisation coefficients to be applied by the frequency domain equaliser 316 and to compute (Step 758) the coefficients of the non-linear filter 354 in order to attenuate OOB signal components.

Further sounding signals can then be generated and/or real data symbols used (Step 760) to improve performance of the frequency domain equaliser 316 further and the non-linear filter 354. The coefficients of the frequency domain equalizer 316 and the non-linear filter 354 can be updated (Steps 752 to 758) using information about the monitoring signals generated by the signal monitoring unit 224 in response to these further signals. A standard least mean squares (LMS) type of algorithm can be employed on a per subcarrier basis by the adaptation signal processor 326 to correct the frequency domain equalisation coefficients. As such, the adapted version of the transmission at the input node 208 converges towards an optimum signal, constituting the isolation signal.

The isolation signal, applied to the balance node 212, with the benefit of application of the predetermined model of the leakage performance of the hybrid junction 204 between the input node 208 and the output node 206 and the improvements to the filter coefficients, serves to cause the hybrid junction 204 to isolate the input node 208 from the output node 206 as well as cancel out OOB signal components over a frequency band of interest (cancel or substantially attenuate the OOB signal components of the transmission signal), when the main transmission signal is applied to the input node 208 and so the main transmission signal is coupled to the antenna node 210 of the hybrid junction 204 for transmission by the antenna 110. The determination and generation of the isolation signal continues, in this example, as long as the transitory signal is present at the tapping point 312.

Hence, it can be seen that a sounding signal can be employed to generate an initial, start-up, isolation signal and the isolation signal can be adjusted using real transmission signals, i.e. non-test transmission signals, to be applied to (and transmitted through) the hybrid junction 204.

Although, in the above example, pre-distortion is introduced by the noise-cancelling auxiliary transmitter chain 350 in the digital domain, the skilled person will appreciate that other pre-distortion schemes can be employed, particularly in the analogue domain, providing the benefit of improved power consumption, but at the expense of reduced precision. For analogue implementations, the up-sampler 352 can be omitted, because the necessary bandwidth to generate higher-order intermodulation products required can be more readily achieved.

In the above-described examples, the transmitter chain 104 and the auxiliary transmitter chain 314 comprise the up-converter 310 and the auxiliary up-converter 322 to perform respective up-conversion using the same local oscillator 328. As such, the up-converters 310, 322 should share the same local oscillator phase noise spectrum characteristics. In order to mitigate local oscillator phase noise, the mixers of the transmitter chain 104 and the auxiliary transmitter chain 314 are configured to ensure phase coherence between the transmitter chain 104 and the auxiliary transmitter chain 314 in order that they both enjoy the same local oscillator phase noise spectrum, thereby correctly cancelling the local oscillator phase noise as much as possible. This also applies to the noise-cancelling auxiliary transmitter chain 350.

In relation to the hybrid junction, the skilled person should appreciate that any suitable construction can be employed. For example, in the above embodiment a transformer hybrid junction has been described. In another embodiment, a quadrature hybrid junction has been employed, although other variants, for example a 180° transformer hybrid junction, could be used. Other suitable kinds of hybrid junction can also be employed, for example a waveguide hybrid junction.

The skilled person should appreciate that the above-described implementations are merely examples of the various implementations that are conceivable within the scope of the appended claims. Indeed, throughout the above description, reference has been made to a transitory signal that has been tapped off from a tapping point in the transmitter chain 104. In this regard, the skilled person should understand that the transitory signal is the signal propagating through the transmitter chain 104 at any chosen point where a portion thereof is extracted and can be any precursor to a transmission signal generated by the power amplifier or any analogous stage of processing the transitory signal.

The systems and methods of the above embodiments may be implemented in a computer system (in particular in computer hardware or in computer software) or in specifically manufactured or adapted integrated circuits, in addition to the structural components and user interactions described.

The methods of the above embodiments may be provided as computer programs or as computer program products or computer readable media carrying a computer program which is arranged, when run on a computer or other processor, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While specific examples of the invention have been described above, the skilled person will appreciate that many equivalent modifications and variations are possible. Accordingly, the exemplary embodiments of the invention set forth above are considered to be illustrative and not limiting. Various changes to the described embodiments may be made without departing from the spirit and scope of the invention.

The invention claimed is:

1. A signal isolation control apparatus for controlling duplexing of signals to be transmitted through and received from an antenna, the apparatus comprising:
a transmitter chain tap input for coupling to a transmitter chain; and
an auxiliary transmitter chain operably coupled to the transmitter chain tap input for processing a transitory signal tapped from the transmitter chain, the auxiliary transmitter chain comprising an adaptive filter unit and a balance node output for operably coupling to a balance node of a hybrid junction; wherein the adaptive filter unit has a signal leakage monitoring input for operably coupling to an output node of the hybrid junction; and
the auxiliary transmitter chain is arranged to process the tapped transitory signal in order to generate and apply an isolation signal at the balance node output for maximising isolation of the output node of the hybrid junction from an input node of the hybrid junction.

2. The apparatus according to claim 1, further comprising:
a signal leakage monitoring tap operably coupled to the signal leakage monitoring input; wherein
the auxiliary transmitter chain is arranged to receive, when in use, a receiver-processed leaked signal via the signal leakage monitoring input.

3. The apparatus according to claim 2, further comprising:
a receiver operably coupled to the signal leakage monitoring input for receiver-processing a leaked signal at the output node of the hybrid junction.

4. The apparatus according to claim 3, wherein the transmitter chain processing stage units comprises a non-linearity generator unit arranged to modify the transitory signal being processed by the auxiliary transmitter chain so that the isolation signal generated by the auxiliary transmitter chain comprises intentional non-linear signal components, and wherein the leaked signal at the output node comprises a spectral component outside of a transmit frequency band, the non-linear signal components of the isolation signal comprising spectral components that are in antiphase with and spectrally coincident with the spectral components of the leaked signal are outside of the transmit frequency band.

5. The apparatus according to claim 3, wherein
the transmitter chain is arranged to generate and apply a test signal to the input node of the hybrid junction during which time the auxiliary transmitter chain is arranged to apply the isolation signal at the balance node;
the receiver is arranged to receive a first leaked signal, $S_{RX1}(\omega)$;
the transmitter chain is arranged not to apply the test signal at the input node of the hybrid junction after measurement of the first leaked signal, $S_{RX1}(\omega)$, during which time the auxiliary transmitter chain is arranged to process the transitory signal corresponding to the test signal and apply the isolation signal generated from the test signal at the balance node of the hybrid junction;
the receiver is arranged to receive a second leaked signal, $S_{RX2}(\omega)$; and
the adaptive filter unit is arranged to calculate coefficients of an adaptive filter using the first and second leaked signals, $S_{RX1}(\omega)$, $S_{RX2}(\omega)$.

6. The apparatus according to claim 5, wherein the isolation signal is arranged so as to interfere destructively with the transmission signal leaked to the output node of the hybrid junction over a frequency range of interest.

7. The apparatus according to claim 1, wherein the auxiliary transmitter chain comprises transmitter chain processing stage units having an input operably coupled to an output of the adaptive filter unit and an output operably coupled to the balance node output, the transmitter chain processing stage units being arranged to complete processing of the tapped transitory signal in accordance with a desired modulation scheme for the transmitter chain.

8. The apparatus according to claim 7, wherein the transmitter chain processing stage units comprises a non-linearity generator unit arranged to modify the transitory signal being processed by the auxiliary transmitter chain so that the isolation signal generated by the auxiliary transmitter chain comprises intentional non-linear signal components.

9. The apparatus according to claim 8, wherein the transmitter chain processing stage units comprises an amplifier succeeding the non-linearity generator unit, and processing by the amplifier of a pre-amplification isolation signal generated in the auxiliary transmitter chain and as modified by the non-linearity generator unit results in the isolation signal comprising the non-linear signal components.

10. The apparatus according to claim 8, wherein a transmission signal generated by the transmitter chain comprises unwanted non-linear signal components, the intentional non-linear signal components being in antiphase with the unwanted non-linear signal components.

11. The apparatus according to claim 1, wherein the isolation signal is a substantially antiphase signal for cancelling a transmission signal generated by the transmitter chain.

12. The apparatus according to claim 1, further comprising:
an impedance operably coupled to the balance node output and constituting a sink for power output at the balance node output.

13. A duplexer apparatus comprising:
the signal isolation control apparatus according to claim 1; and
the hybrid junction having the input node for receiving a transmission signal, an antenna node for coupling to the antenna, the output node for outputting a received signal from the antenna, and the balance node; wherein
the balance node output of the auxiliary transmitter chain is operably coupled to the balance node of the hybrid junction; and
the signal leakage monitoring input is operably coupled to the output node of the hybrid junction.

14. The apparatus according to claim 13, wherein the adaptive filter unit comprises an adaptive filter having a transfer function arranged to approximate an estimate of an amplitude and a phase of signal leakage between the input node and the output nodes of the hybrid junction, the approximation generated being in antiphase to the signal leakage.

15. The apparatus according to claim 14, wherein the adaptive filter unit is arranged to modify, when in use, coefficients of the adaptive filter in response to a receive feedback signal.

16. The apparatus according to claim 15, wherein the transmission signal, when applied to the input node of the hybrid junction, is leaked to the output node of the hybrid junction via a notional self-interference channel and the isolation signal, when applied to the input node of the hybrid junction, is leaked to the output node of the hybrid junction via a notional cancellation channel.

17. The apparatus according to claim 16, wherein the adaptive filter unit is arranged to modify the tapped transitory signal so that a modified transitory signal when completely processed by the auxiliary transmitter chain results in the isolation signal received at the output node via the cancellation channel cancelling the leaked transmission signal received at the output node via the self-interference channel.

18. The apparatus according to claim 15, wherein the adaptive filter unit comprises a coefficient processor operably coupled to the signal leakage monitoring input and the adaptive filter, the coefficient processor being arranged to modify, when in use, the coefficients of the adaptive filter in response to the receive feedback signal.

19. A wireless transceiver apparatus comprising:
a duplexer apparatus according to claim 13; and
the transmitter chain operably coupled to the input node of the hybrid junction and arranged to generate and apply the transmission signal at the input node of the hybrid junction.

20. The apparatus according to claim 19, wherein the transmitter chain comprises an up-converter and the auxiliary transmitter chain comprises another up-converter; and the up-converter and the another up-converter are arranged to ensure phase coherence such that local oscillator noise components cancel out.

21. A communications device comprising the duplexer apparatus according to claim 13.

22. A communications device comprising the transceiver apparatus according to claim 19.

23. A communications device comprising the signal isolation control apparatus according to claim 1.

24. A method of controlling a hybrid junction for duplexing signals to be transmitted through and received from an antenna, the hybrid junction comprising an input node for receiving a transmission signal, an antenna node for coupling to the antenna, an output node for outputting a received signal from the antenna and a balance node, the method comprising:
tapping a transitory transmit signal off a transmitter chain;
providing an auxiliary transmitter chain;
the auxiliary transmitter chain receiving the transitory transmit signal and generating a feedforward isolation signal to maximize isolation of the output node of the hybrid junction from the input node of the hybrid junction; and
applying the feedforward isolation signal to the balance node.

* * * * *